US011106248B2

(12) United States Patent
Campbell et al.

(10) Patent No.: US 11,106,248 B2
(45) Date of Patent: Aug. 31, 2021

(54) HINGED DEVICE

(71) Applicant: Microsoft Technology Licensing, LLC, Redmond, WA (US)

(72) Inventors: Kent Campbell, Issaquah, WA (US); Errol M. Tazbaz, Bellevue, WA (US); Rachel A. Shaffer, Seattle, WA (US); Karsten Aagaard, Monroe, WA (US); Kabir Siddiqui, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/380,838

(22) Filed: Apr. 10, 2019

(65) Prior Publication Data

US 2020/0326756 A1    Oct. 15, 2020

(51) Int. Cl.
*G06F 1/16* (2006.01)
*E05D 3/12* (2006.01)
*E05D 11/08* (2006.01)

(52) U.S. Cl.
CPC .......... *G06F 1/1681* (2013.01); *E05D 3/122* (2013.01); *E05D 11/082* (2013.01); *E05Y 2900/606* (2013.01); *G06F 1/1616* (2013.01); *G06F 1/1647* (2013.01)

(58) Field of Classification Search
CPC ....... E05D 3/122; E05D 11/082; E05D 7/086; E05D 2201/25; Y10T 16/54038
See application file for complete search history.

(56) References Cited

U.S. PATENT DOCUMENTS

| | | | | |
|---|---|---|---|---|
| 3,229,323 A | * | 1/1966 | Hensgen | .................. E05D 7/04 16/247 |
| 5,682,645 A | * | 11/1997 | Watabe | ................. G06F 1/1616 16/338 |
| 6,058,671 A | * | 5/2000 | Strickland | ............. E04B 1/6137 411/539 |
| 6,085,388 A | * | 7/2000 | Kaneko | ................. G06F 1/1681 16/338 |

(Continued)

FOREIGN PATENT DOCUMENTS

WO        03056410 A1    7/2003

OTHER PUBLICATIONS

"International Search Report and Written Opinion Issued in PCT Application No. PCT/US2019/023492", dated Jun. 17, 2019, 11 Pages.

(Continued)

*Primary Examiner* — Victor D Batson
*Assistant Examiner* — Matthew J Sullivan
(74) *Attorney, Agent, or Firm* — Rainier Patents, P.S.

(57) ABSTRACT

The description relates to hinged devices, such as hinged computing devices. One example can include a hinge assembly that rotatably secures a first portion and a second portion. The hinge assembly can define a hinge shaft. The hinge assembly can include an adjustable closed-loop friction band secured to the first portion. The adjustable closed-loop friction band can extend between an aperture end and a removable end. The removable end can include a removable torque control element having a thickness that also at least in part controls a dimension of an aperture that receives the hinge shaft and thereby controls friction between the aperture and the hinge shaft.

20 Claims, 6 Drawing Sheets

(56) References Cited

U.S. PATENT DOCUMENTS

| | | | |
|---|---|---|---|
| 7,472,459 B2* | 1/2009 | Lee | G06F 1/1601 16/297 |
| 7,536,747 B2* | 5/2009 | Christeson | E05D 5/02 16/247 |
| 7,895,711 B2* | 3/2011 | Shen | G06F 1/1616 16/342 |
| 8,024,841 B2* | 9/2011 | Shen | G06F 1/1681 16/339 |
| 8,196,263 B2* | 6/2012 | Wang | G06F 1/1681 16/338 |
| 8,385,991 B2 | 2/2013 | Wang et al. | |
| 8,982,542 B2 | 3/2015 | Bohn | |
| 9,347,249 B2* | 5/2016 | Marshall | E05D 7/121 |
| 9,388,614 B2 | 7/2016 | Hsu | |
| 9,534,432 B2 | 1/2017 | Lee et al. | |
| 9,563,236 B2* | 2/2017 | Rittenhouse | G06F 1/1683 |
| 9,665,130 B2* | 5/2017 | Hu | G06F 1/1681 |
| 9,791,256 B1* | 10/2017 | Beer | E06B 1/6069 |
| 9,857,849 B1 | 1/2018 | Siddiqui et al. | |
| 10,100,970 B1 | 10/2018 | Wu et al. | |
| 10,241,548 B2 | 3/2019 | Tazbaz et al. | |
| 10,253,804 B2 | 4/2019 | Park et al. | |
| 10,344,510 B2 | 7/2019 | Siddiqui et al. | |
| 10,364,598 B2 | 7/2019 | Tazbaz et al. | |
| 10,401,914 B2 | 9/2019 | Shang | |
| 10,465,427 B2 | 11/2019 | Chen et al. | |
| 10,488,882 B2 | 11/2019 | Maatta et al. | |
| 10,501,973 B2 | 12/2019 | Maatta et al. | |
| 2004/0134033 A1* | 7/2004 | Raines | G02B 27/0149 16/342 |
| 2008/0184527 A1* | 8/2008 | Chao | G06F 1/1616 16/221 |
| 2009/0070961 A1 | 3/2009 | Chung et al. | |
| 2011/0072620 A1* | 3/2011 | Wang | G06F 1/1681 16/342 |
| 2015/0062793 A1 | 3/2015 | Chen et al. | |
| 2016/0010375 A1 | 1/2016 | Rittenhouse | |
| 2018/0059735 A1 | 3/2018 | Tazbaz et al. | |
| 2018/0066465 A1 | 3/2018 | Tazbaz et al. | |
| 2019/0056768 A1 | 2/2019 | Lin | |
| 2019/0094917 A1 | 3/2019 | Schmelzle et al. | |
| 2019/0155344 A1 | 5/2019 | Lin et al. | |
| 2019/0169897 A1* | 6/2019 | Jiang | F16F 7/06 |
| 2019/0301215 A1 | 10/2019 | Siddiqui et al. | |
| 2020/0012322 A1 | 1/2020 | Jan et al. | |
| 2020/0012323 A1 | 1/2020 | Huang et al. | |
| 2020/0064890 A1* | 2/2020 | Siddiqui | F16C 11/04 |

OTHER PUBLICATIONS

"Non Final Office Action Issued in U.S. Appl. No. 15/938,757", dated Feb. 12, 2020, 10 Pages.

"Non Final Office Action Issued in U.S. Appl. No. 15/938,757", dated Dec. 3, 2020, 13 Pages.

"International Search Report and Written Opinion Issued in PCT Application No. PCT/US20/025617", dated Jun. 17, 2020, 13 Pages.

"Final Office Action Issued in U.S. Appl. No. 15/938,757", dated Jul. 24, 2020, 10 Pages.

* cited by examiner

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing hinge assemblies that can rotationally secure first and second device portions relative to a hinge axis. For instance, in some cases a first hinge axis relates to the first portion and a second hinge axis relates to the second portion. The present concepts can provide a definable and consistent resistance to rotation around the hinge axes. This resistance to rotation can ensure that the device maintains an orientation selected by the user. The resistance to rotation can be provided by an adjustable closed-loop friction band. The adjustable closed-loop friction band can be adjusted so that the resistance to rotation satisfies design parameters over the lifespan of the device. These and other aspects are described below.

Figure 1:
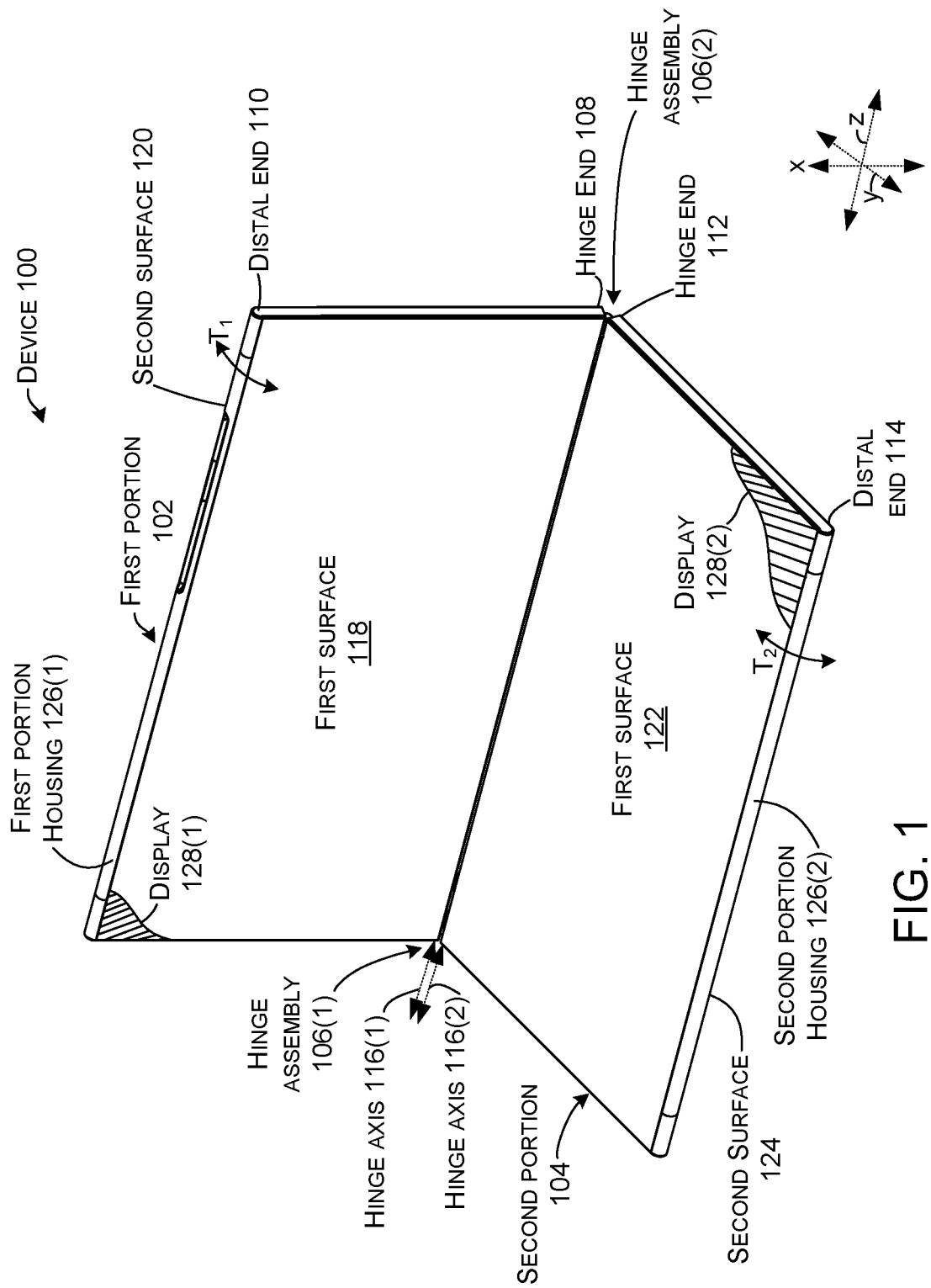
FIGS. 1, 2A, and 2B show perspective views of example devices in accordance with some implementations of the present concepts.

Introductory FIG. 1 shows an example device 100 that has first and second portions 102 and 104 that are rotatably secured together by hinge assemblies 106. In the illustrated implementation, two hinge assemblies 106(1) and 106(2) are employed (e.g., one near each end of the device), but other implementations could employ a single hinge assembly or more than two hinge assemblies.

The first portion 102 can extend from a hinge end 108 to a distal end 110. The second portion 104 also can extend from a hinge end 112 to a distal end 114. In this example, the hinge assemblies 106 can define two hinge axes 116. The first portion 102 can rotate around first hinge axis 116(1) and the second portion 104 can rotate around second hinge axis 116(2). Other implementations can include a single hinge axis. Still other implementations can employ three or more hinge axes.

Hinge assemblies 106 can define a resistance to rotation relative to the first hinge axis 116(1) and the second hinge axis 116(2). Stated another way, the hinge assemblies 106 can define an amount of torque ($T_1$) required to overcome the resistance to rotation and rotate the first portion 102 around the first axis and/or the amount of torque ($T_2$) required to overcome the resistance to rotation and rotate the second portion 104 around the second hinge axis 116(2).

The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view.)

In some implementations, the first portion 102 can include a first housing (e.g., first portion housing 126(1)) and the second portion 104 can include a second housing (e.g., second portion housing 126(2)). In the illustrated example, a display 128(1) is positioned on first portion housing 126(1) and display 128(2) is positioned on second portion housing 126(2). In this case, the displays 128 are positioned on the first surfaces 118 and 122, respectively. In other examples, the displays 128 can be positioned on the first and/or second surfaces 118, 120, 122, and/or 124, respectively.

Figure 2A:
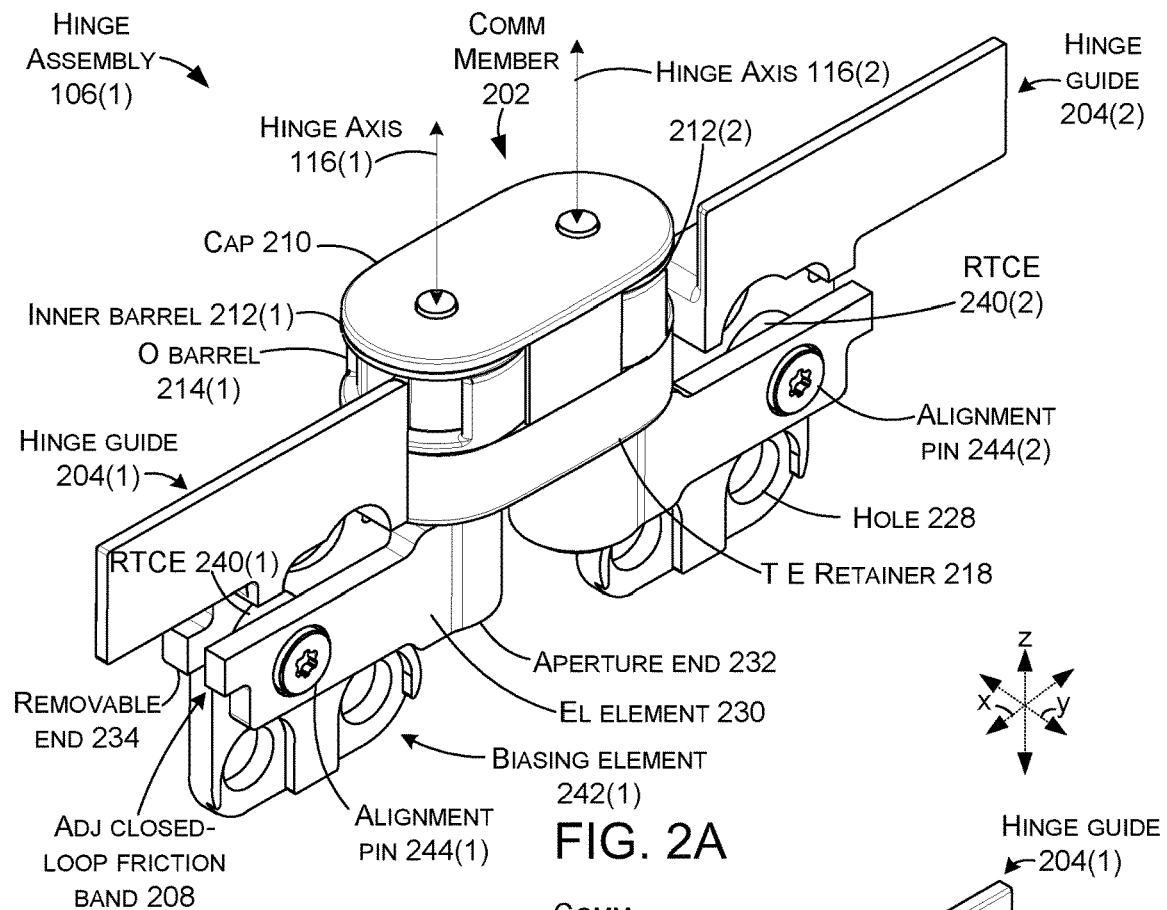
Figure 2B:
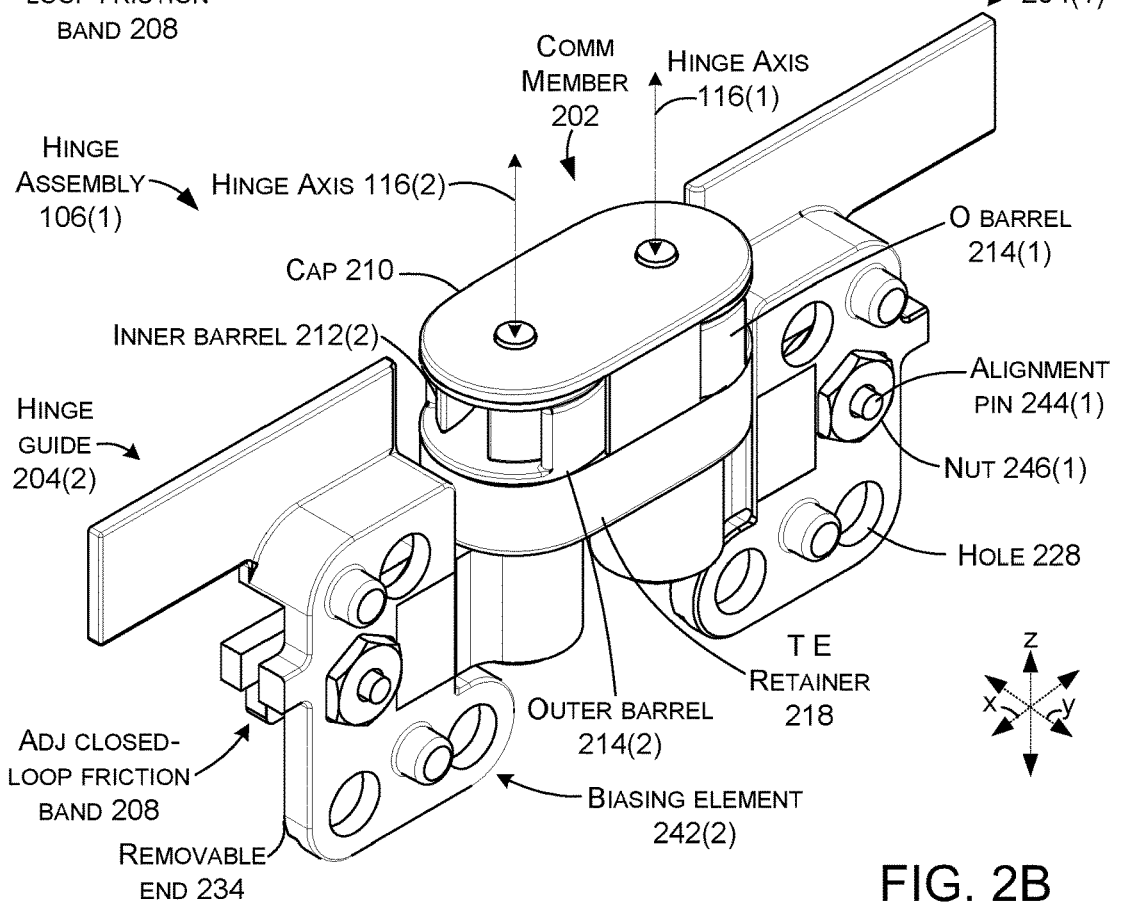
Figure 2C:
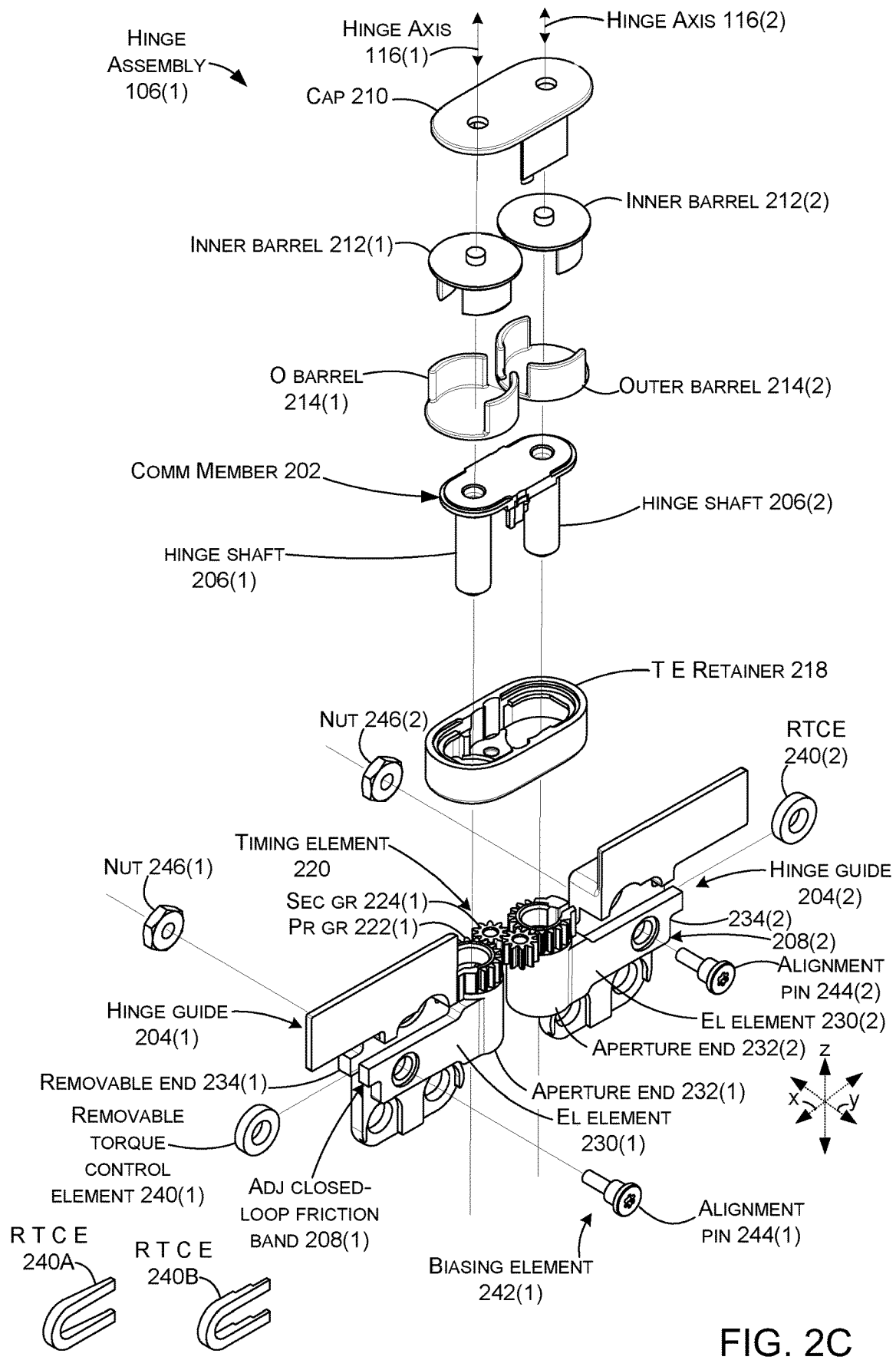
FIG. 2C shows an exploded perspective view of an example device in accordance with some implementations of the present concepts.
Figure 2D:
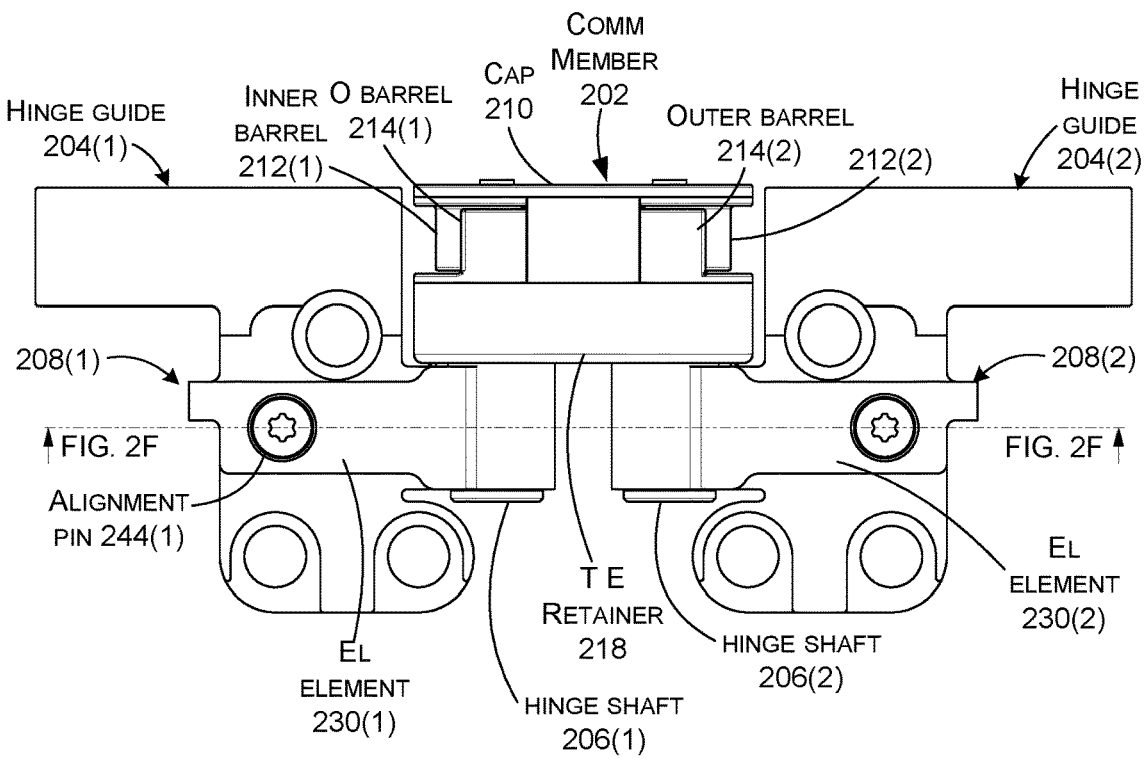
FIGS. 2D and 2E show elevational views of example devices in accordance with some implementations of the present concepts.
Figure 2E:
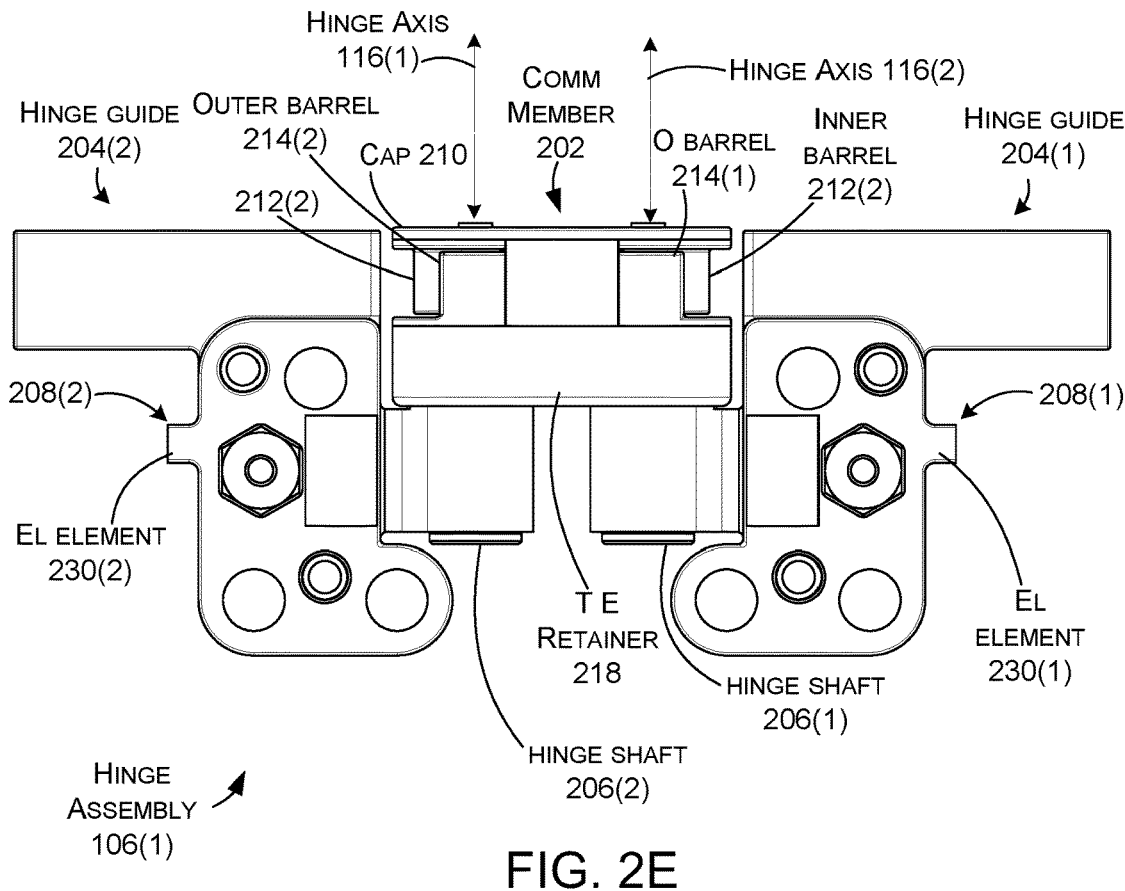
Figure 2F:
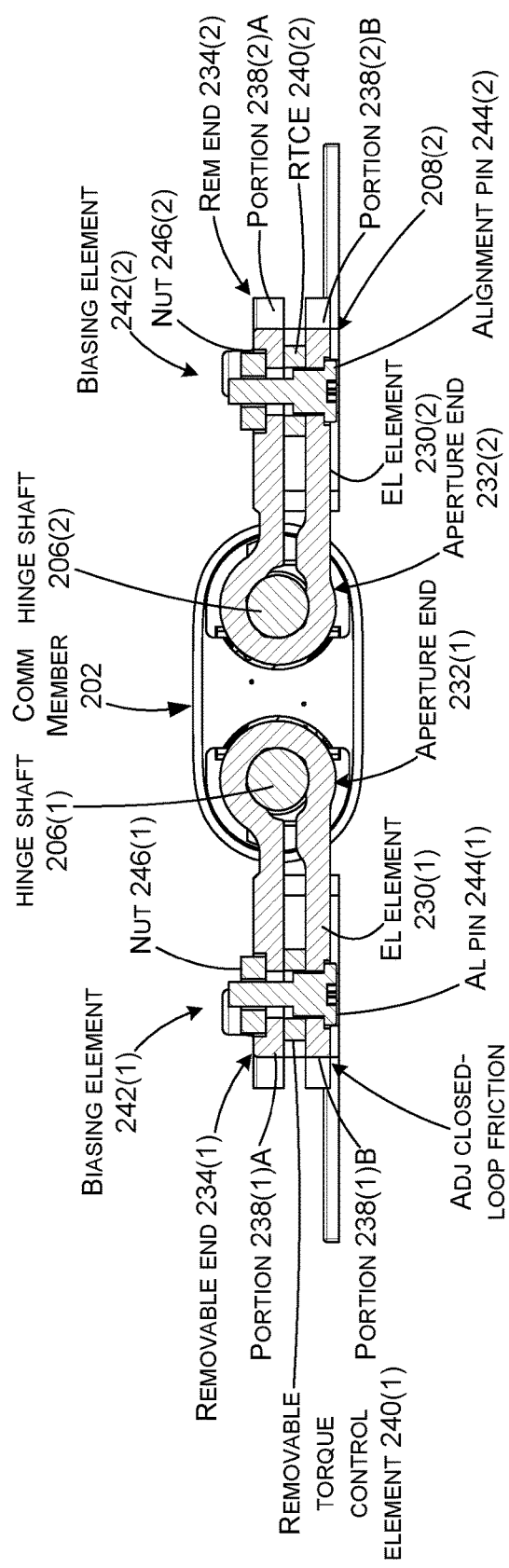
FIGS. 2F and 2G, show sectional and exploded sectional views, respectively, of example devices in accordance with some implementations of the present concepts.
Figure 2G:
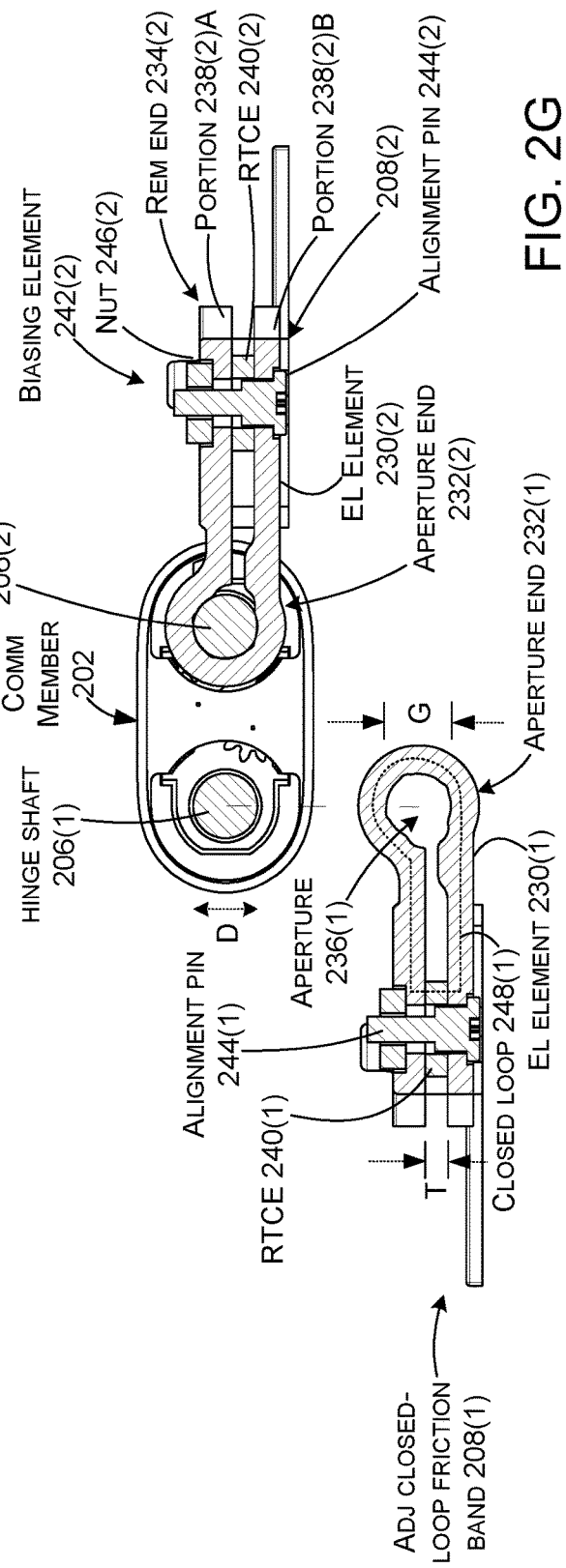

FIGS. 2A-2G collectively show details of example hinge assembly 106(1). FIGS. 2A and 2B are perspective views of example hinge assembly 106(1) showing opposite viewpoints. FIG. 2C is an exploded perspective view of hinge assembly 106(1) from the same viewpoint as FIG. 2A. FIGS. 2D and 2E are elevational views of the hinge assembly 106(1). FIG. 2F is a sectional view as indicated in FIG. 2D. FIG. 2G is a partially exploded sectional view that is similar to FIG. 2F.

The hinge assembly 106(1) can include a communication member 202 and hinge guides 204. The communication member 202 can define parallel hinge shafts 206. The hinge shafts 206 can be fixed in non-rotating relation to one another. The hinge shafts can define the hinge axes 116. The hinge guides 204 can include adjustable closed loop friction bands 208 that control torque required to rotate the hinge guides 204 relative to the hinge shafts 206.

The hinge assembly 106(1) can also include a cap 210, inner barrels 212, outer barrels 214, and a retainer 218. The hinge assembly can also include timing elements 220. In this case, the timing elements include primary gears 222 that can be defined by the hinge guides 204 and secondary gears 224. The hinge guides 204 can be secured to the first and second portions (102 and 104, FIG. 1), such as with fasteners (not shown) through holes 228.

The adjustable closed-loop friction bands 208 can include an elongate element 230. In the illustrated configuration, the elongate element 230 is bent back (e.g., folded back) upon itself to define an aperture end 232 and a removable end 234. The aperture end 232 can define an aperture 236. Portions 238 proximate the removable end 234 can be biased or forced against a removable torque control element 240 by a biasing element 242. In the illustrated configuration, the biasing element 242 is manifest as a threaded fastener 244 that operates cooperatively with a nut 246. The fastener 244 can pass through holes in the elongate element 230 and the removable torque control element 240. (These holes are shown, but not specifically designated.) Alternatively, the biasing element 242 could be manifest as a clamp positioned around the elongate element 230, among other solutions. The biasing element 242 and the removable torque control element 240 collectively define a distance between the portions 238.

As noted above, the aperture end 232 of the adjustable closed-loop friction band 208 can define aperture 236. A dimension (e.g., gap G of FIG. 2G) of the aperture 236 can be defined by a relationship of portions 238 of the elongate element 230 and the removable torque control element 240. The elongate element 230 can be a resilient material, such as spring steel or other stiff material that is resistant to creep over time. The aperture 236 can receive the hinge shaft 206(1). The hinge shaft can have an outside dimension D (FIG. 2G). The dimension (gap G) of the aperture 236 can be adjusted to control friction between the hinge arm and the hinge shaft 206. The friction can control torque required to rotate the adjustable closed-loop friction band 208 (and hence the first and second portions) relative to the hinge shaft 206.

The portions 238 can be biased toward one another against removable torque control element 240 by biasing element 242 to complete a closed loop 248. A distance between the portions 238 can be defined by the thickness (T in FIG. 2G) of the removable torque control element 240. The distance can at least in part control a gap G of aperture 236. The closed loop 248 can cause aperture 236 to have and maintain gap G much more consistently (e.g., does not tend to change over time and/or usage, such as during rotation of the first and second portions) when compared to existing solutions.

The consistent gap G can produce consistent friction between the hinge shafts 206 and the apertures 236. The consistent friction results in consistent torque to rotate the device portions. For instance, with the closed loop 248 of the adjustable closed-loop friction band 208, the gap G, once set can be consistent for the life of the device. Further, the gap G tends not to change depending upon how the device is handled. For instance, in previous solutions, rotating the device portions (102 and 104) very quickly and/or opening the device portions while bumping into an object may cause the gap to change, and hence the torque to change. Further, in at least some of the present implementations, elongate element 230 can prevent relative motion of portions of the adjustable closed-loop friction band 208 in an impact loading condition. Further still, the presently described closed loop 248 can allow the fastener 244 and nut 246 to be positively tightened against the portions 238 and removable torque control element 240, such that the inward force of the fastener and nut is countered by an equal outer force. This balance of forces tends to keep the fastener from 'backing out' over time, which would result in a larger gap and less torque.

The adjustable closed-loop friction band 208 provides a solution so that torque values are within design constraints for every device that is assembled. For instance, a first removable torque control element 240 can be installed in the adjustable closed-loop friction band 208. The biasing element 242 can force the portions 238 against the removable torque control element 240 to complete the closed loop 248. Torque measurements can be taken for rotating the first and second portions. If the measured torque is within design tolerances, assembly is complete. If the measured torque is lower than a designed tolerance range, the removable torque control element 240 can be removed and replaced with a thinner removable torque control element 240 (e.g., to reduce gap G). If the measured torque is higher than the designed tolerance range, the removable torque control element 240 can be removed and replaced with a thicker removable torque control element 240 (e.g., to expand gap G). This process can be repeated until design tolerances are satisfied. The closed loop 248 can ensure that the adjustable closed-loop friction band 208 will maintain the desired torque through repeated cycles.

FIG. 2C shows removable torque control elements 240 that have a uniform thickness. In this case, removable torque control elements 240 are donut shaped with a uniform thickness T (FIG. 2G). FIG. 2C also shows two alternative removable torque control elements 240A and 240B. These versions have variable thicknesses that allow adjustment of gap G by sliding the removable torque control element relative to the biasing element 242 and the removable ends 234. Removable torque control elements 240A have a tapered profile from a thinner end to a thicker end (e.g., lesser thickness to greater thickness). Removable torque control elements 240B have a stepped profile from a thinner end to a thicker end. The removable torque control elements 240 can be formed of an incompressible material, such as a metal. Biasing of the portions 238 against the removable torque control elements 240 can cause the removeable end 234 of the closed loop 248 to have consistent dimensions, which produces consistent aperture dimensions.

Note that in an alternative implementation, the removable torque control elements 240 can be state-transitionable. For instance, the removable torque control elements 240 could be an epoxy material or other adhesive that is installed in semi-viscous state. The thickness T could be set by adjusting the biasing element 242. The torque could then be measured and adjusted via the biasing element. The removable torque control elements 240 could then transition (or be transitioned) to a rigid state (e.g., cured) to complete the closed-loop 248 and maintain the torque. The torque could be remeasured and if the torque falls outside of the designed torque range, the removable torque control element can be removed, a new one installed and the thickness set to a slightly thinner or thicker value.

Looking again at the communication member in FIG. 2C, the communication member can receive nested inner and outer barrels 212 and 214 in a rotational relation (e.g., the inner and outer barrels are secured relative to the communication member and can rotate around the hinge axes 116. A conductor (not shown), such as traditional insulated wire(s) and/or a flexible printed circuit(s) (FPC) can pass from portion 102 through the inner and outer barrels 212 and 214 and to the second portion 104. The inner and outer barrels 212 and 214 can protect the conductor from damage when the first and second portions are rotated relative to one another. The conductor can be retained by a cap 210, which secures to retainer 218 over the inner barrels 212, and outer barrels 214. The retainer 218 in turn can be secured to the communication member 202.

The timing element 220 can synchronize rotation (e.g., extent of rotation) of the first and second portions 102 and 104 around the first and second hinge axes 116. For instance, the timing element 220 can ensure that 20 degrees of rotation around the first hinge axis 116(1) simultaneously produces 20 degrees of rotation around the second hinge axis 116(2).

In the illustrated implementation, the timing element 220 can be manifest as intermeshing gears. For instance, hinge guides 204 can define primary gears 222 (only 222(1) labeled due to space constraints) that can interact with intervening or secondary gears 224 (only 224(1) labeled due to space constraints).

Figure 3:
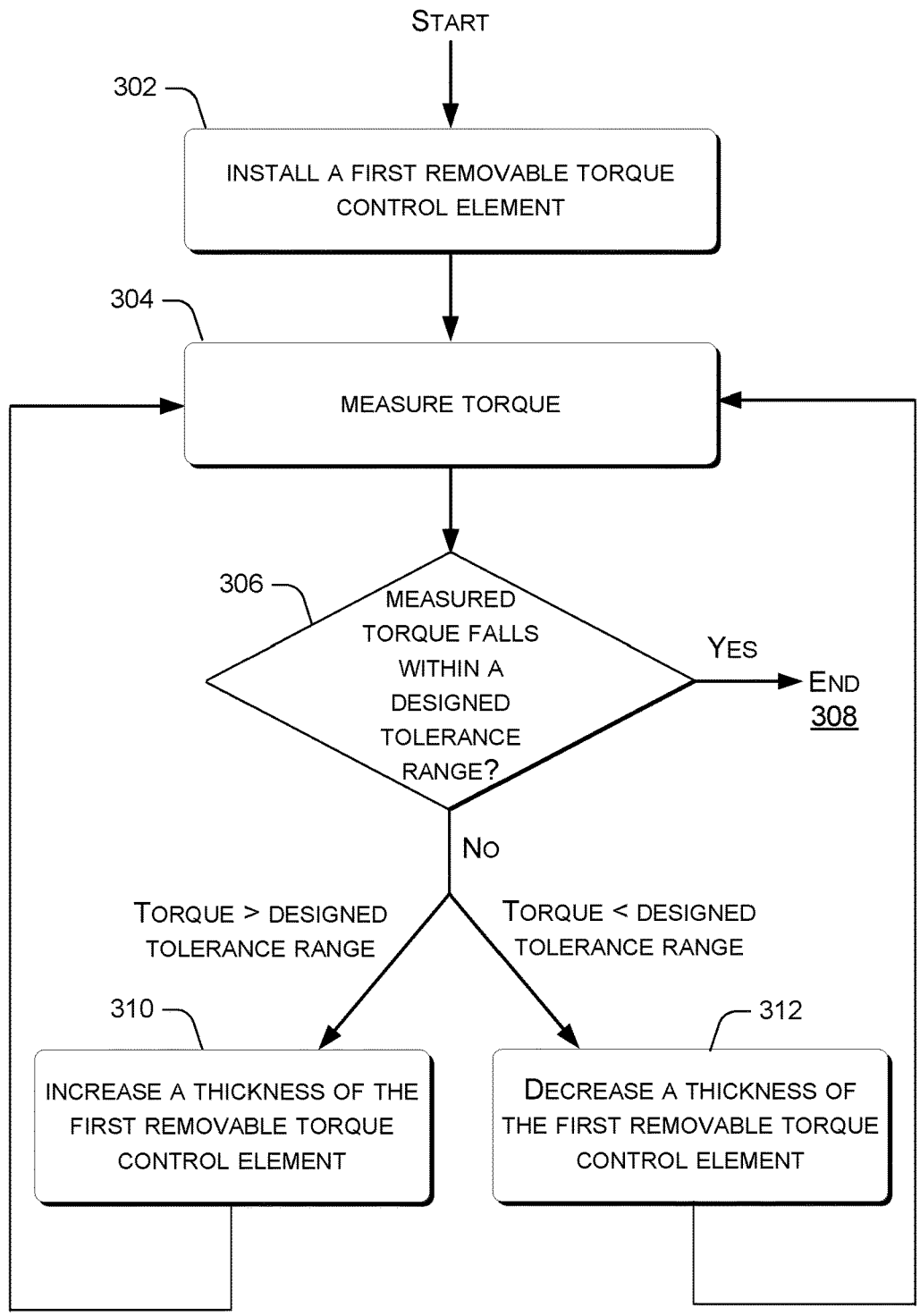
FIG. 3 shows a flowchart of an example assembly method in accordance with some implementations of the present concepts.

FIG. 3 shows a flowchart of an example assembly method 300. In this example, block 302 can install a first removable torque control element in an adjustable closed-loop friction band relative to a first hinge axis between a hinge assembly and a first portion. Block 304 can measure torque required to rotate the first portion around the first hinge axis. Block 306 can query whether the measured torque falls within a designed tolerance range for the hinge axis. If the measured torque falls within the designed tolerance range for the hinge axis the process is complete at 308.

If the measured torque is higher than the designed tolerance range, block 310 can increase a thickness of the first removable torque control element as experienced by the adjustable closed-loop friction band. In some implementations, the increasing can entail substituting a second thicker removable torque control element for the first removable torque control element. In other cases, the increasing can entail adjusting a position of the first removable torque control element so that a thickness experienced by the adjustable closed-loop friction band is increased. The process can then return to block 304 to remeasure torque required to rotate the first portion around the first hinge axis.

If the measured torque is lower than the designed tolerance range at bock 306, block 312 can decrease a thickness of the first removable torque control element as experienced by the adjustable closed-loop friction band. In some implementations, the increasing can entail substituting a third thinner removable torque control element for the first removable torque control element. In other cases, the increasing can entail adjusting a position of the first removable torque control element so that a thickness experienced by the adjustable closed-loop friction band is decreased. The process can then return to block 304 to remeasure torque required to rotate the first portion around the first hinge axis.

This process can be repeated for each hinge axis independently so that each hinge axis satisfies the designed tolerance range.

Individual elements of the hinge assemblies can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, and/or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-3.

Although techniques, methods, devices, systems, etc., pertaining to closed-loop friction band hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first portion and a second portion that are rotatably secured by a hinge assembly, the hinge assembly defining a hinge shaft and an adjustable closed-loop friction band secured to the first portion. The adjustable closed-loop friction band comprising an elongate element that is folded back on itself to define an aperture positioned around the hinge shaft. Portions of the elongate element being forced toward one another to a distance defined by an intervening removable torque control element having a thickness that also at least in part controls a dimension of the aperture and thereby controls friction between the aperture and the hinge shaft.

Another example can include any of the above and/or below examples where the intervening removable torque control element is donut shaped.

Another example can include any of the above and/or below examples where the device further comprises an adjustable fastener that passes through holes in two portions of the elongate element and the intervening removable torque control element to cause the two portions of the adjustable closed-loop friction band to be forced toward one another.

Another example can include any of the above and/or below examples where the intervening removable torque control element is open ended.

Another example can include any of the above and/or below examples where the intervening removable torque control element has a greater thickness at a closed end than at an open end.

Another example can include any of the above and/or below examples where the thickness is stepped.

Another example can include any of the above and/or below examples where the thickness is tapered.

Another example can include any of the above and/or below examples where the hinge assembly defines a second hinge shaft that is parallel to the hinge shaft.

Another example can include any of the above and/or below examples where the device further comprises a second adjustable closed-loop friction band secured to the second portion. The second adjustable closed-loop friction band comprising a second elongate element that is folded back on itself to define a second aperture positioned around the second hinge shaft, portions of the second elongate element being forced toward one another to a distance defined by an intervening second removable torque control element having a thickness that also at least in part controls a dimension of the second aperture and thereby controls friction between the second aperture and the second hinge shaft.

Another example can include any of the above and/or below examples where the device further comprises a communication member that includes the hinge shaft and the second hinge shaft.

Another example can include any of the above and/or below examples where the hinge shaft and the second hinge shaft are fixed in non-rotating configurations and the first portion rotates around the hinge shaft at the aperture and the second portion rotates around the second hinge shaft at the second aperture.

Another example includes a device comprising a first portion and a second portion that are rotatably secured by a hinge assembly. The hinge assembly defining a hinge shaft and an adjustable closed-loop friction band secured to the first portion. The adjustable closed-loop friction band extending between an aperture end and a removable end that comprises a removable torque control element having a thickness that also at least in part controls a dimension of an aperture that receives the hinge shaft and thereby controls friction between the aperture and the hinge shaft.

Another example can include any of the above and/or below examples where the removable torque control element has a uniform thickness.

Another example can include any of the above and/or below examples where the removable torque control element defines a hole passing therethrough and has a uniform thickness except for the hole.

Another example can include any of the above and/or below examples where the device further comprises a biasing element that biases opposing portions of the removeable end against the removable torque control element.

Another example can include any of the above and/or below examples where the biasing element comprises a threaded fastener that can be adjusted to control an extent of the bias.

Another example can include any of the above and/or below examples where the adjustable closed-loop friction band comprises a resilient material.

Another example can include any of the above and/or below examples where the removable torque control element comprises an incompressible material.

Another example includes a device comprising a first portion that is rotatably secured around a first hinge shaft and a second portion that is rotatably secured around a second hinge shaft that is parallel to the first hinge shaft, a first adjustable closed-loop friction band secured between the first portion and the first hinge shaft and including a first removable end biased against a first removable torque control element that controls friction between the first portion and the first hinge shaft, and a second adjustable closed-loop friction band secured between the second portion and the second hinge shaft and including a second removable end biased against a second removable torque control element that controls friction between the second portion and the second hinge shaft.

Another example can include any of the above and/or below examples where a thickness of the first removable torque control element is the same as a thickness of the second removable torque control element or wherein the thickness of the first removable torque control element is different than a thickness of the second removable torque control element.

The invention claimed is:

1. A device, comprising:
    a first portion and a second portion that are rotatably secured by a hinge assembly, the hinge assembly defining a first hinge shaft around which the first portion rotates and a second hinge shaft around which the second portion rotates;
    a first adjustable closed-loop friction band secured to the first portion, the first adjustable closed-loop friction band comprising a first timing gear and a first elongate element that is folded back on itself to define an aperture positioned around the first hinge shaft, portions of the first elongate element being forced toward one another to a distance defined by an intervening removable torque control element having a thickness that also at least in part controls a dimension of the aperture and thereby controls friction between the aperture and the first hinge shaft; and,
    a second adjustable closed-loop friction band secured to the second portion, the second adjustable closed-loop friction band comprising a second timing gear and a second elongate element that is folded back on itself to define a second aperture positioned around the second hinge shaft, the second timing gear interacting with the first timing gear to synchronize rotation around the first and second hinge shafts.

2. The device of claim 1, wherein the intervening removable torque control element is donut shaped.

3. The device of claim 2, further comprising an adjustable fastener that passes through holes in two portions of the first elongate element and the intervening removable torque control element to cause the two portions of the adjustable closed-loop friction band to be forced toward one another.

4. The device of claim 1, wherein the intervening removable torque control element is open ended.

5. The device of claim 4, wherein the intervening removable torque control element has a greater thickness at a closed end than at an open end.

6. The device of claim 5, wherein the thickness is stepped.

7. The device of claim 5, wherein the thickness is tapered.

8. The device of claim 1, wherein the intervening removable torque control element is incompressible and the thickness is equal to the distance.

9. The device of claim 8, wherein the second adjustable closed-loop friction band comprises a second intervening removeable torque control element that is incompressible and has a thickness that defines a distance of the folded back second elongate element and that completes the second adjustable closed-loop friction band.

10. The device of claim 9, further comprising a communication member that includes the first hinge shaft and the second hinge shaft.

11. The device of claim 10, wherein the first hinge shaft and the second hinge shaft are fixed in non-rotating configurations and the first portion rotates around the first hinge shaft at the aperture and the second portion rotates around the second hinge shaft at the second aperture.

12. A device, comprising:
    a hinge assembly defining first and second hinge shafts;
    a first portion that is rotatably secured relative to the first hinge shaft;
    a second portion that is rotatably secured relative to the second hinge shaft;
    a timing element that synchronizes rotation around the first and second hinge shafts; and,
    an adjustable closed-loop friction band secured to the first portion, the adjustable closed-loop friction band extending between an aperture end and a removable end that comprises a removable incompressible torque control element having a thickness that also at least in part controls a dimension of an aperture that receives the first hinge shaft and thereby controls friction between the aperture and the hinge shaft.

13. The device of claim 12, wherein the removable incompressible torque control element has a uniform thickness.

14. The device of claim 12, wherein the removable incompressible torque control element defines a hole passing therethrough and has a uniform thickness except for the hole.

15. The device of claim 12, further comprising a biasing element that biases opposing portions of the removeable end against the removable incompressible torque control element.

16. The device of claim 15, wherein the biasing element comprises a threaded fastener that can be adjusted to control an extent of the bias.

17. The device of claim 12, wherein the adjustable closed-loop friction band comprises a resilient material.

18. The device of claim 12, wherein the removable incompressible torque control element completes the adjustable closed-loop friction band comprising solid material.

19. A device, comprising:
    a first portion that is rotatably secured around a first hinge shaft and a second portion that is rotatably secured around a second hinge shaft that is parallel to the first hinge shaft;

a first adjustable closed-loop friction band secured between the first portion and the first hinge shaft and including a first removable end biased against a first removable undeformable torque control element that controls friction between the first portion and the first hinge shaft; and, a second adjustable closed-loop friction band secured between the second portion and the second hinge shaft and including a second removable end biased against a second removable undeformable torque control element that controls friction between the second portion and the second hinge shaft.

20. The device of claim 19, wherein the first removable undeformable torque control element is undeformable in that the biasing of the first end of the first adjustable closed-loop friction band against the first removable undeformable torque control element does not change a thickness of the first removable undeformable torque control element, and wherein the second removable undeformable torque control element is undeformable in that the biasing of the first end of the second adjustable closed-loop friction band against the second removable undeformable torque control element does not change a thickness of the second removable undeformable torque control element.

\* \* \* \* \*